(12) United States Patent
Musci et al.

(10) Patent No.: US 10,415,483 B2
(45) Date of Patent: Sep. 17, 2019

(54) METHOD TO CONTROL THE OPERATING TEMPERATURE OF A GAS TURBINE HEATER

(71) Applicant: Jet Heat LLC, Livonia, MI (US)

(72) Inventors: Anthony Joseph Musci, Ann Arbor, MI (US); Steven Lee Tracht, Chelsea, MI (US)

(73) Assignee: JETHEAT LLC, Livonia, MI (US)

( * ) Notice: Subject to any disclaimer, the term of this patent is extended or adjusted under 35 U.S.C. 154(b) by 705 days.

(21) Appl. No.: 14/969,639

(22) Filed: Dec. 15, 2015

(65) Prior Publication Data

US 2016/0169119 A1 Jun. 16, 2016

Related U.S. Application Data

(60) Provisional application No. 62/092,005, filed on Dec. 15, 2014.

(51) Int. Cl.
*F02C 9/18* (2006.01)
*F02C 6/08* (2006.01)

(52) U.S. Cl.
CPC ............... *F02C 9/18* (2013.01); *F02C 6/08* (2013.01); *F05D 2270/08* (2013.01); *F05D 2270/303* (2013.01)

(58) Field of Classification Search
CPC ...... F02C 9/18; F02C 9/28; F02C 6/08; F05D 2270/303; F05D 2270/3032
See application file for complete search history.

(56) References Cited

U.S. PATENT DOCUMENTS

| 2,975,783 | A | * | 3/1961 | Dallenbach | F02C 6/18 126/110 E |
|---|---|---|---|---|---|
| 3,107,892 | A | | 10/1963 | Ellis | |
| 3,487,993 | A | | 1/1970 | Rannenberg | |
| 3,511,576 | A | | 5/1970 | Herbstritt et al. | |
| 3,705,491 | A | * | 12/1972 | Foster-Pegg | F01K 21/042 60/242 |
| 3,909,152 | A | | 9/1975 | Rannenberg | |
| 4,794,760 | A | * | 1/1989 | White | F01D 17/105 251/129.05 |
| 5,127,230 | A | | 7/1992 | Neeser et al. | |
| 5,222,356 | A | * | 6/1993 | Evenson | F02C 7/057 415/26 |
| 6,073,857 | A | | 6/2000 | Gordon et al. | |
| 6,161,768 | A | | 12/2000 | Gordon et al. | |

(Continued)

*Primary Examiner* — Gerald L Sung
*Assistant Examiner* — Rene D Ford
(74) *Attorney, Agent, or Firm* — Lorenz & Kopf LLP

(57) ABSTRACT

A control method and mechanization is disclosed to bleed compressor air in order to control the gas turbine of a turbo heater. Compressed air may selectively bleed with a control value in order to increase or decrease the efficiency of the gas turbine unit. Additionally, the control system enables the bleed air system allows to re-circulate compressed air to mix with the combustion air and provide a pre-heat thereof. The control system further enables re-direction of the combustion feed stream into the exhaust gas stream to promote complete combustion of the unburned fuel and combustion by-products in a catalytic converter downstream of the gas turbine to provide a breathable exhaust gas from the turbo heater.

20 Claims, 3 Drawing Sheets

(56) References Cited

U.S. PATENT DOCUMENTS

| | | | | |
|---|---|---|---|---|
| 6,663,011 B1* | 12/2003 | Entleutner | ............... | F02C 6/18 |
| | | | | 237/12.1 |
| 6,679,433 B2 | 1/2004 | Gordon et al. | | |
| 8,015,826 B2* | 9/2011 | Myers | ................... | F01K 13/02 |
| | | | | 60/782 |
| 8,327,644 B2 | 12/2012 | Gordon et al. | | |
| 8,682,811 B2 | 3/2014 | Burges et al. | | |
| 8,733,110 B2 | 5/2014 | Weber et al. | | |
| 2005/0150231 A1* | 7/2005 | Laster | ...................... | F02C 9/18 |
| | | | | 60/777 |
| 2009/0056342 A1* | 3/2009 | Kirzhner | ................ | F01D 25/12 |
| | | | | 60/772 |
| 2010/0215480 A1* | 8/2010 | Leach | ...................... | F02C 9/18 |
| | | | | 415/145 |
| 2010/0251727 A1* | 10/2010 | Myers | .................... | F01K 13/02 |
| | | | | 60/773 |
| 2011/0154806 A1* | 6/2011 | Hoyte | .................... | F01N 3/208 |
| | | | | 60/276 |
| 2011/0185713 A1* | 8/2011 | Koopmann | ............... | F01N 5/02 |
| | | | | 60/320 |
| 2013/0125557 A1* | 5/2013 | Scipio | ...................... | F02C 9/22 |
| | | | | 60/773 |
| 2015/0322857 A1* | 11/2015 | Ethier | .................... | F02C 7/264 |
| | | | | 290/2 |

\* cited by examiner

METHOD TO CONTROL THE OPERATING TEMPERATURE OF A GAS TURBINE HEATER

CROSS-REFERENCE TO RELATED APPLICATIONS

This application claims the benefit of U.S. Provisional Application No. 62/092,005, filed on Dec. 15, 2014. The entire disclosure of the above application is incorporated herein by reference.

TECHNICAL FIELD

The present disclosure relates generally to engine control of a micro gas turbine engine, and more particularly relates to a control method to bleed turbine compressor air for controlling the exhaust gas temperature of a micro gas turbine heater.

BACKGROUND

This section provides background information related to the present disclosure which is not necessarily prior art.

Gas turbine engines are typically used in work-generating applications in the form of a rotating drive shaft, and engine control is generally optimized for maximum shaft work per unit of fuel. In these applications bleed air is commonly used with the objective to power accessories or control cycle parameters such as surge. In all of these cases, it is recognized that the bleed air reduces the thermal efficiency of the gas turbine in terms of shaft work per unit fuel. This efficiency loss is typically addressed by using a "bleed-less" engine technology.

Recent efforts have shown that gas turbine engines can be useful in heat generation applications. In particular, a small gas turbine engine has proven to be relatively trouble-free and extremely efficient such that it makes an excellent heater. Such a heater application is different from the conventional work-generating applications in that the efficiency objective is heat output rather than shaft work. As such varying the bleed air to control heat output certainly changes the energy balance of the system but results in no loss of efficiency since any shaft work loss is turned into useful heat.

Accordingly, it is desirable to provide a method to bleed turbine compressor air for controlling the exhaust gas temperature of a gas turbine heater. In addition, it is desirable to a control algorithm for bleeding turbine compressor air to control the exhaust gas temperature of a gas turbine heater. Furthermore, other desirable features and characteristics of the present invention will become apparent from the subsequent detailed description of the invention and the appended claims, taken in conjunction with the accompanying drawings and this background of the invention.

SUMMARY

In accordance with the present disclosure, a heater module includes an internal combustion micro turbine with no external or exposed flame, and burning of the fuel is configured to be contained entirely within the combustion walls. The heater module is capable of converting over 90% of any suitable fuel (e.g. an ultra-low sulfur Diesel fuel) to usable heat. During operation the diesel fuel is vaporized rather than burned as a liquid, before it enters the combustion chamber. A control algorithm and mechanization of the heater module enable precise control of the exhaust gas temperature through turbine compressor air bleeding. As a result, combustion is continuously sustained which is highly efficient and extremely clean. Output from the micro turbine produces clean exhaust. An after-treatment device in the form of a catalytic converter reduces the emission in the exhaust such that clean, breathable air is output from the heater module.

BRIEF DESCRIPTION OF THE DRAWINGS

The drawings described herein are for illustrative purposes only of selected embodiments and not all possible implementations, and are not intended to limit the scope of the present disclosure. Thus, the selected embodiments will hereinafter be described in conjunction with the following drawing figures, wherein like numerals denote like elements, and wherein.

Corresponding reference numerals indicate corresponding parts throughout the several views of the drawings.

DETAILED DESCRIPTION

The present disclosure provides a method and control system for varying the bleed air from the turbine compressor to control heat output. The bleed air can be reintroduced or recirculated at various locations within the turbo heater without any result in loss of efficiency since the heat associated with the bleed air is recovered within the system. Example embodiments will now be described more fully with reference to the accompanying drawings. There is no intention to be limited by any principle presented in the preceding background or the following detailed description. Like reference numbers will be used to indicate the same or similar components in various embodiments.

Turbo heater 10 is a diesel fueled self-contained and self-sustaining heating system for supplying heated air in remote locations. Turbo heater 10 may also be equipped with a generator set (not shown) driven by the shaft assembly for providing electrical power. The turbo heater includes a micro turbine 12 designed to supply the majority of its energy as heat in the form of exhaust gases, and a minor amount as shaft power used to rotate the turbine compressor and drive an auxiliary fan 26. The configuration of turbo heater 10 provides an economical construction which is especially designed for reduced manufacturing costs. The internal aerodynamics, such as the turbine and compressor wheels, uses well-developed technology. In this regard, a peak cycle temperature of about 1500° F. is preferred to allow the use of economical materials for the high temperature components.

Figure 1:
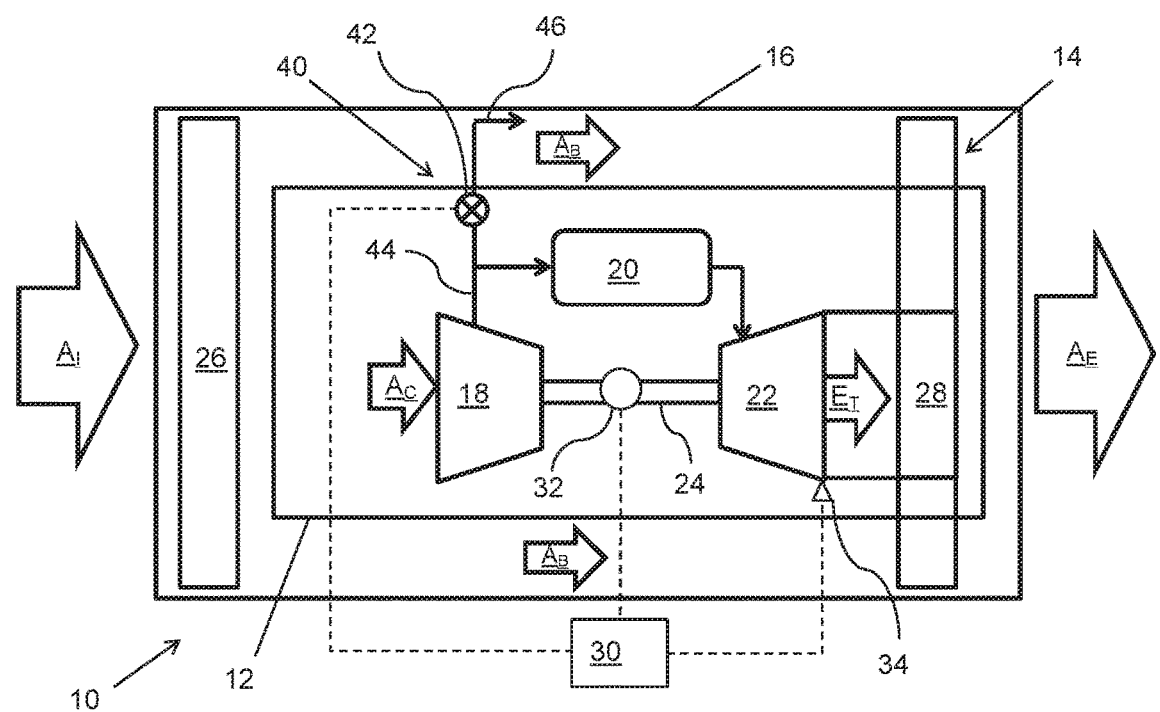
FIG. 1 is a schematic illustration of an embodiment of the gas turbine heater showing a mechanization for bleeding turbine compressor into the bypass stream of the gas turbine heater.
Figure 2:
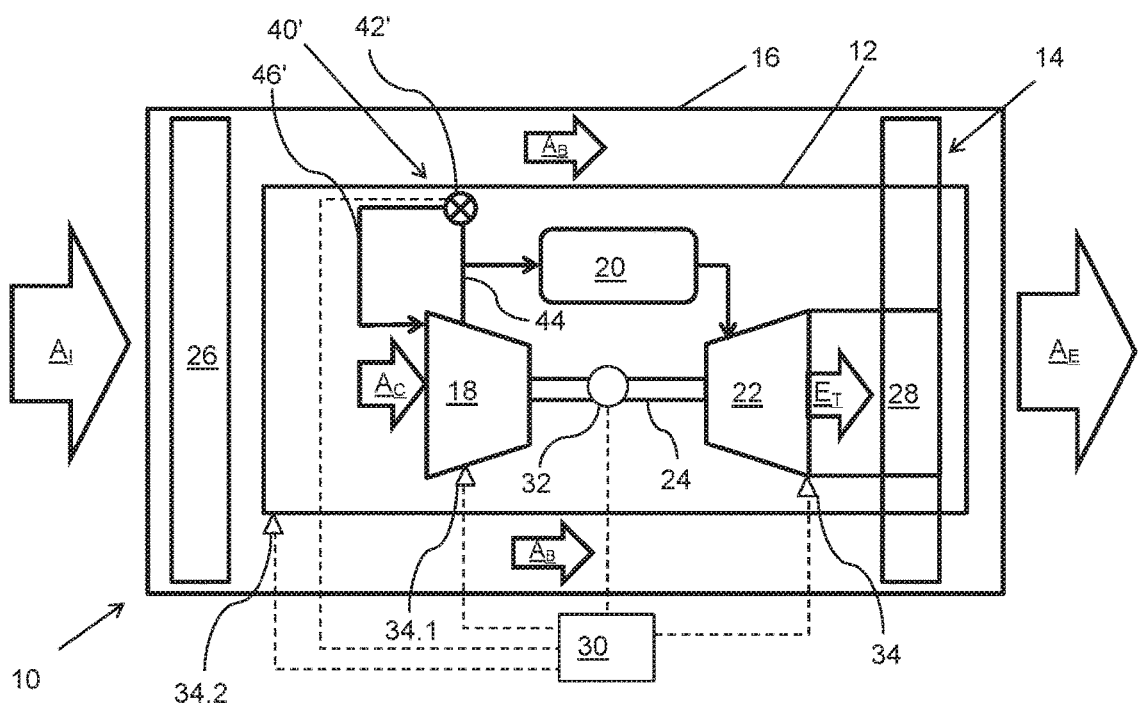
FIG. 2 is a schematic illustration of an embodiment of the gas turbine heater showing a mechanization for bleeding turbine compressor into the compressor intake for pre-heating the turbine inlet air.
Figure 3:
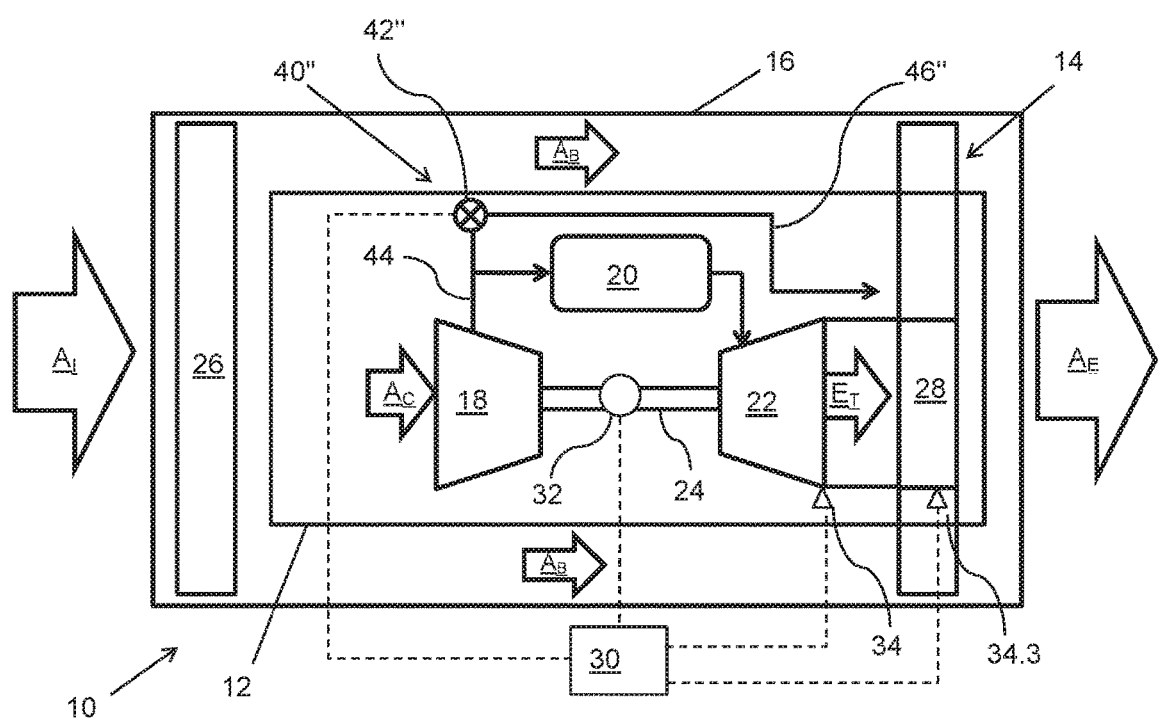
FIG. 3 is a schematic illustration of an embodiment of the gas turbine heater showing mechanization for bleeding turbine compressor into the turbine exhaust stream of the gas turbine heater.

With reference now to FIGS. 1-3, a turbo heater 10 includes a micro turbine engine 12 and one or more heat exchange elements 14, 28 which are supported with in a housing 16. Gas turbine engine 12 draws ambient combustion air ($A_C$) through a compressor 18, receives fuel, preferably an ultra-low sulfur Diesel fuel, from a fuel system (not shown) to form an air-fuel mixture which is drawn into the a combustor 20. In the combustor 20 the air fuel mixture is burned in a combustor 20 to form an exhaust gas which exits the combustor 20 and expands the through a turbine 22. As such, gas turbine engine 12 provides a source of heat, as well as a source of rotary power. The rotating components of the gas turbine engine 12, namely compressor 18 and turbine 22, are mounted on a high-speed shaft assembly 24. The shaft assembly 24 may also be coupled through a reduction gear assembly or gearbox (not shown) to a fan 26. The fan 26 functions to draw intake air ($A_I$) which includes combustion air ($A_C$) well as bypass air ($A_B$) into the housing 16. As schematically shown in the figures, the compressor 18 and the turbine 22 are mounted on a common shaft assembly 24. One skilled in the art should, however, recognize that the shaft assembly of gas turbine engine 12 may include multiple, separate shafts. Likewise, the fan 26 is illustrated as an axial fan, but may take any form which functions to draw intake air into the turbo heater housing.

A heat exchange element 14 is used to recover the resulting heat in the exhaust gases and transfer the resulting heat to it to heated air ($A_E$) exhausted from the turbo heater 10. The heat exchange element 14 preferably includes a suitable catalytic converter 28 which reduces the carbon monoxide and other exhaust emissions in the exhaust gases ($E_T$) to discharge essentially breathable heated air ($A_E$) from the turbo heater 10.

The turbo heater 10 is provided with an engine controller 30 which is operably coupled to the gas turbine engine 12. The turbo heater 10 further includes an engine speed sensor 32 for measuring the engine speed. In one embodiment, the engine speed sensor may be a tachometer measuring the rotational speed of the shaft assembly 24. The turbo heater 10 also includes a temperature sensor 34 configured to measure a temperature at that location and send a signal representative of the measured value to the engine controller 30. In one embodiment, the temperature sensor is a thermocouple arranged at the discharge of the turbine 22. While the control algorithm of the present disclosure is illustrated and described as using the turbine exhaust temperature, one skilled in the art will appreciate that use a temperature measurement at any turbine location. Further details concerning the components and configuration of the turbo heater 10 in general, as well as the engine controller 30 are described in U.S. Pat. Nos. 6,073,857, 6,161,768, 6,679,433 and 8,327,644, the disclosures of which are expressly incorporated by reference herein.

With continued reference to FIG. 1, the turbo heater 10 includes a bleed air circuit 40 having a bleed air control valve 42 in fluid communication with the feed line 44 from the compressor 18 to the combustor 20. The bleed air control valve 42 is operable to re-direct air from the feed line 44 to a vent line 46 which dumps air from the compressor 18 into the bypass stream flowing between the turbine 12 and the housing 16. In this configuration, the bleed air is vented into the by-pass stream ($A_B$) such that the heat associated with the bleed air is recovered in the heater exhaust. In this configuration, the bleed air is vented to the by-pass stream when heat generation from the gas turbine is required. While the bleed air control valve 42 is shown in the teed line 44 from the compressor 18 to the combustor 20, one skilled in the art will appreciate that the bleed air control value 42 may re-direct bleed air from the compressor 18 at any location where the pressure differential in the vent line 46 provides air flow rate of bleed air into the by-pass stream ($A_B$).

With reference to FIG. 2, turbo heater 10 is substantially similar to that shown in FIG. 1, but includes a bleed air circuit 40' in fluid communication with the feed line 44 from the compressor 18 to the combustor 20. The bleed air control valve 42' is operable to bleed air from the feed line 44 to a recirculation line 46' which re-directs bleed air into the inlet of the compressor 18. In this configuration, the bleed air is re-circulated into the compressor intake to provide an intake air pre-heat when the ambient temperatures are extremely low. Additional sensors, such as temperature sensor 34.1 in the compressor 18 and/or temperature sensor 34.2 at the inlet of the gas turbine 12, are configured to measure a temperature at those locations and send a signal representative of the measured value to the engine controller 30. Again, one skilled in the art will appreciate that the bleed air control value 42' may re-direct bleed air from the compressor 18 at any location where the pressure differential in the recirculation line 46' provides sufficient air flow rate of bleed air into the compressor inlet ($A_C$).

With reference to FIG. 3, the turbo heater 10, and in particular micro turbine 12 includes a bleed air circuit 40" in fluid communication with the feed line 44 between the compressor 18 and the combustor 20. The bleed air control valve 42" is operable to re-direct air from the feed line 44 through the by-pass line 46" into the turbine exhaust stream ($E_T$). In this configuration, the bleed air is passed through the catalytic convertor 28 for enriching oxygen/air content in the exhaust stream ($E_T$) for promoting the catalytic reaction and recovering heat in the heat exchange element 14. An additional sensor 34.3, such as a temperature sensor and/or an exhaust gas sensor, is configured to measure a temperature or exhaust gas quality at that location and send a signal representative of the measured value to the engine controller 30. Again, one skilled in the art will appreciate that the bleed air control value 42" may re-direct bleed air from the compressor 18 at any location where the pressure differential in the by-pass line 46" provides sufficient air flow rate of bleed air into the exhaust stream ($E_T$).

Various embodiments of the turbo heater 10, and in particular the sensors 34, 34.1, 34.2, 34.3 and the bleed air circuit 40, 40', 40" are described above and illustrated in FIGS. 1-3. One skilled in the art will appreciate that a gas turbine 12 will likely include multiple sensors for use in the operation and control of the turbo heater 10. Likewise, the gas turbine 12 may have a bleed air configuration circuit which includes one or more bleed air circuits 40, 40', 40" as described above. As such, a multiple directional control valve or multiple control valves may be used to re-direct bleed air into the by-pass stream ($A_B$) or the turbine exhaust stream ($E_T$) or to re-circulate bleed air into the compressor inlet ($A_C$).

As noted above, the turbo heater 10 includes an engine controller 30 in communication with various sensors and control devices (e.g., valves) associated with the turbo heater 10. The engine controller 30 may receive input signals from various sensors configured to generate the signals in proportion to various physical parameters associated with the turbo heater 10. The engine controller 30 may include a digital central processing unit (CPU) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus is configured to send, receive, and modulate analog and/or digital signals to/from the various sensors and control devices. The program may embody the methods disclosed herein, allowing the CPU to carryout out the steps of such methods and control the engine controller 30.

A program stored in the memory system is on a computer readable medium or machine readable medium known in the art, and which should be understood to be a computer program code residing on a non-transitory carrier. In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an engine controller 30, the turbo heater 10 may have a different type of processor to provide the electronic logic, e.g. an embedded controller, an onboard computer, or any processing module that might be deployed in the vehicle. The engine controller 30 is generally configured to carry out many different tasks, including those set forth in the control algorithm detailed below.

The control algorithm executed on the engine controller 30 may take into account various operating states of the turbo heater 10 with the objective to optimize heat generation from the turbo heater 10. For example, a call for heat command requires additional heat generation from the gas turbine 12. The call for heat may result from a user input to increase the heat output from the turbo heater 10 or from the engine controller 30 to maintain the desired operating temperature of the gas turbine 12. Under this condition, the engine controller 30 will query (or recall from memory) the current speed of the shaft from the speed sensor 32 and the current temperature of the turbine exhaust from sensor 34. Based on these operating conditions, the engine controller 30 will adjust the bleed air control valve 42 to affect the call for heat. For example, when a call for more heat is received and the turbine 12 is operating at a relatively low engine speed, the bleed air control valve 42 is adjusted to open and re-direct a portion of the compressor air off of the feed line 44, which will cause the gas turbine to speed up and generate more heat. Conversely, when a call for less heat is received, the bleed air control valve 42 will close down causing the gas turbine 12 to run cooler and slower. A full range of value setting are exercised on the basis of the engine speed and turbine exhaust gas temperatures to optimize the heat generation and fuel efficiency of the turbo heater 10. In this regard, the control algorithm provides means for controlling the outlet temperature of the turbine exhaust by varying the bleed air from the compressor.

The control algorithm executed on the engine controller 30 may take into account the temperature of the combustion air stream ($A_C$). For example, the temperature of the combustion air may be too cold for proper combustion, during start-up or in extremely cold operating conditions, such that a pre-heat of the combustion air is beneficial. Under this condition, the engine controller will query will query (or recall from memory) the current inlet temperature of the combustion air. Based on this measurement, the engine controller 30 will adjust the bleed air control valve 42' to a recirculate the heated feed stream so as to provide a pre-heat charge for the combustion air. Specifically, the air in feed line 44 which has been heated by virtue of the work imparted by the compressor 18 is recirculated to and mixed with the combustion air stream ($A_C$) to increase its temperature.

The control algorithm executed on the engine controller 30 may also take into account the temperature or emission quality of the exhaust gas stream ($E_T$) to ensure complete combustion of the air-fuel mixture in the gas turbine 12 and the combustion by-products in the catalytic converter 28. For example, the exhaust gas quality (e.g., oxygen content, CO content, NOx content) of the exhaust gas stream ($E_T$) may not meet the proper levels for providing a breathable air, such that additional after-treatment of the exhaust gas stream is necessary. Under this condition, the engine controller 30 will query (or recall from memory) the current temperature and/or gas quality of the exhaust gas stream. Based on this measurement, the engine controller 30 will adjust the bleed air control valve 42" to increase the air flow to the catalytic converter 28. Specifically, the air in feed line 44 is re-directed into the exhaust gas stream to enrich the oxygen content so that complete combustion of any unburned fuel and combustion by-products can be occur in the catalytic converter 228.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling the operation of a gas turbine in turbo heater housing wherein a combustion gas stream is compressed in a compressor section of the gas turbine, a mixture of fuel and compressed combustion air is combusted in a combustor section of the gas turbine, and an exhaust gas stream is expanded in a turbine section of the gas turbine, the method comprising:
   measuring a temperature of the exhaust gas stream;
   generating a call for heat command when the exhaust gas stream temperature is outside a predetermined temperature range; and
   operating a bleed air control valve in a feed line between the compressor section and the combustor section in response to the call for heat command to re-direct a bleed air stream into a vent line in fluid communication with a vent air stream between the gas turbine and a turbo heater housing, into a recirculation line in fluid communication with a compressor inlet air stream, or into a by-pass line in fluid communication with the exhaust gas stream.

2. The method of claim 1 wherein the exhaust gas stream temperature is below the predetermined temperature range such that the call for heat command is a call for more heat command, the method further comprising operating the bleed air control valve to increase the bleed air stream, thereby causing the gas turbine to speed up and generate more heat.

3. The method of claim 1 wherein the exhaust gas stream temperature is above the predetermined temperature range such that the call for heat command is a call for less heat command, the method further comprising operating the bleed air control valve to decrease the bleed air stream, thereby causing the gas turbine to slow down and generate less heat.

4. The method of claim 1 further comprising re-directing the bleed air stream into the vent line.

5. The method of claim 1 further comprising:
   measuring a temperature of the combustion gas stream;

generating a control command when the combustion gas stream temperature is less than a predetermined combustion gas stream temperature; and operating the bleed air control valve in response to the control command to re-direct the bleed air stream into the recirculation line to increase a temperature of the compressor inlet air stream.

6. The method of claim 5 further comprising:

measuring an exhaust gas parameter of the exhaust gas stream from the turbine section;

generating a second control command when the exhaust gas parameter is outside a predetermined exhaust gas parameter range; and operating the bleed air control valve in response to the second control command to re-direct the bleed air stream into the by-pass line to enrich the oxygen content of the exhaust gas stream.

7. The method of claim 1 further comprising directing the exhaust gas stream through an after-treatment device downstream of the turbine section.

8. The method of claim 7 further comprising:

measuring an exhaust gas parameter of the exhaust gas stream from the after-treatment device;

generating a control command when the exhaust gas parameter is outside a predetermined exhaust gas parameter range; and operating the bleed air control valve in response to the control command to re-direct the bleed air stream into the by-pass line to enrich the oxygen content of the exhaust gas stream.

9. The method of claim 8 wherein measuring an exhaust gas parameter comprises measuring a temperature of the exhaust gas stream exiting the after-treatment device.

10. The method of claim 8 wherein measuring an exhaust gas parameter comprises measuring an oxygen content of the exhaust gas stream exiting the after-treatment device.

11. A turbo heater comprising:

a gas turbine having a compressor section configured to compress a combustion gas stream, a combustor configured to combust a mixture of fuel and compressed combustion air, and a turbine section configured to expand an exhaust gas stream, wherein the turbine section and the compressor section are rotatably coupled through a shaft assembly;

a bleed air circuit having a feed line between the compressor section and the combustor section and a bleed air control valve for re-directing a bleed air stream from the feed line into a vent line in fluid communication with a vent air stream between the gas turbine and a turbo heater housing, a recirculation line in fluid communication with a compressor inlet air stream, or a by-pass line in fluid communication with the exhaust gas stream;

a temperature sensor configured to measure an exhaust gas temperature of the exhaust gas stream; and an engine controller configured to:

receive a signal from the temperature sensor representative of the exhaust gas temperature;

generate a call for heat command when the exhaust gas temperature is outside a predetermined temperature range; and operate the bleed air control valve in response to the call for heat command for re-directing the bleed air stream into the vent line, the recirculation line or the by-pass line.

12. The turbo heater of claim 11 wherein the engine controller is further configured to operate the bleed air control valve to increase the bleed air stream, thereby causing the gas turbine to speed up and generate more heat when the exhaust gas temperature is below the predetermined temperature range such that the call for heat command is a call for more heat command.

13. The turbo heater of claim 11 wherein the engine controller is further configured to operate the bleed air control valve to decrease the bleed air stream, thereby causing the gas turbine to slow down and generate less heat when the exhaust gas temperature is above the predetermined temperature range such that the call for heat command is a call for less heat command.

14. The turbo heater of claim 11 wherein the engine controller is further configured to re-direct the bleed air stream into the vent line.

15. The turbo heater of claim 11 wherein the engine controller is further configured to:

measure a temperature of the combustion gas stream;

generate a control command when the combustion gas stream temperature is less than a predetermined combustion gas stream temperature; and operate the bleed air control valve in response to the control command to re-direct the bleed air stream into the recirculation line to increase a temperature of the compressor inlet air stream.

16. The turbo heater of claim 15 wherein the engine controller is further configured to:

measure an exhaust gas parameter of the exhaust gas stream from the turbine section;

generate a second control command when the exhaust gas parameter is outside a predetermined exhaust gas parameter range; and operate the bleed air control valve in response to the second control command to re-direct the bleed air stream into the by-pass line to enrich the oxygen content thereof of the exhaust gas stream.

17. The turbo heater of claim 11 further comprising an after-treatment positioned downstream of the turbine section and receiving the exhaust gas stream therefrom.

18. The turbo heater of claim 17 further comprising:

an exhaust gas sensor configured to measure an exhaust gas parameter of the exhaust gas stream from the after-treatment device;

wherein the engine controller is further configured to generate a control command when the exhaust gas parameter is outside a predetermined exhaust gas parameter range, and operate the bleed air control valve in response to the control command to re-direct the bleed air stream into the by-pass line for enriching the oxygen content of the exhaust gas stream.

19. The turbo heater of claim 18 wherein the exhaust gas sensor comprises a second temperature sensor and the exhaust gas parameter measured is a temperature of the exhaust gas stream measured thereby.

20. The turbo heater of claim 18 wherein the exhaust gas sensor comprises an oxygen sensor and the exhaust gas parameter measured is an oxygen content of the exhaust gas stream.

* * * * *